3,721,722
THICKENABLE UNSATURATED POLYESTER
RESIN SYSTEM
Melvin E. Baum, Monroeville, Pa., assignor to
Koppers Company, Inc.
Continuation of application Ser. No. 671,849, Sept. 29,
1967. This application July 16, 1970, Ser. No. 56,236
Int. Cl. C08f 21/02, 43/08
U.S. Cl. 260—862   1 Claim

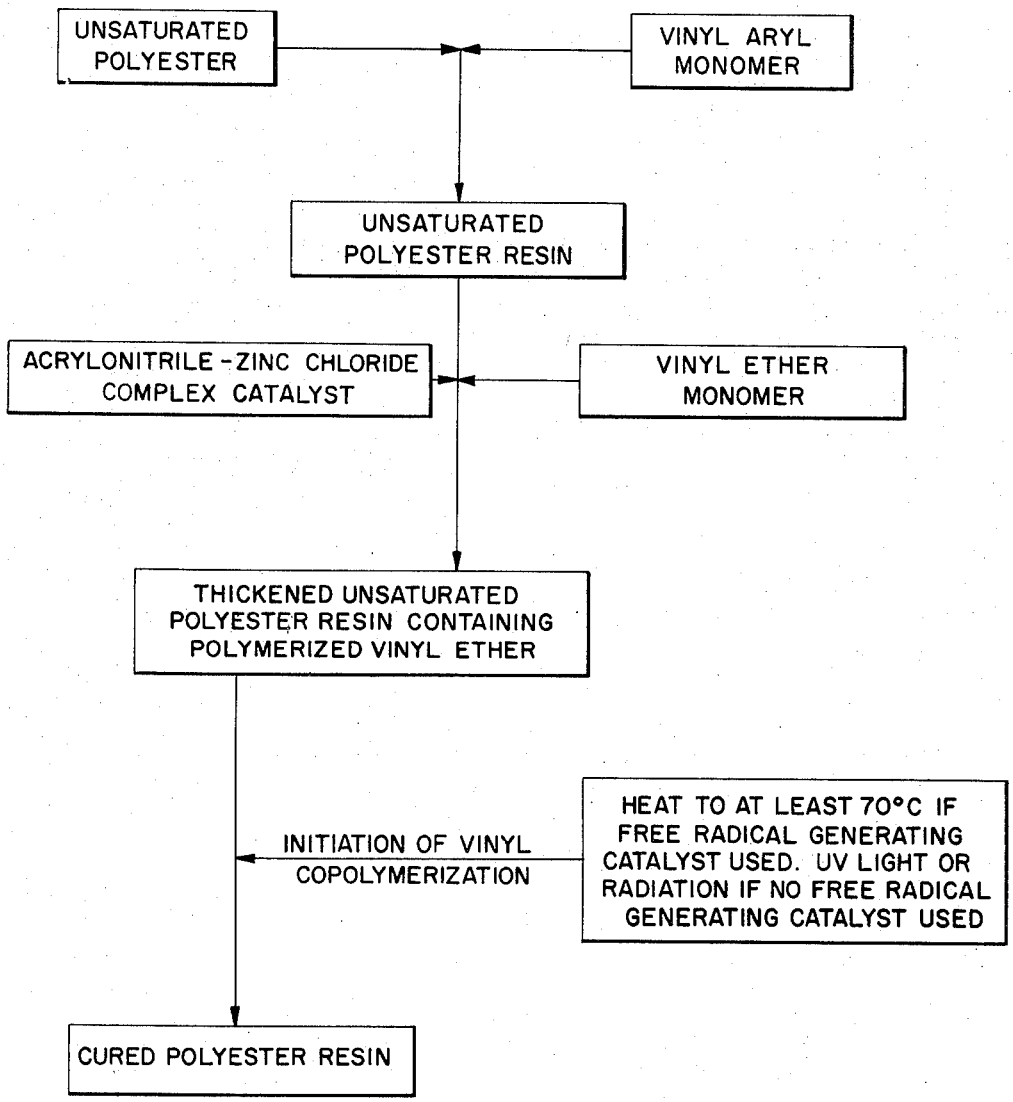

ABSTRACT OF THE DISCLOSURE

An unsaturated polyester resin capable of being chemically thickened comprises: (1) an unsaturated polyester; (2) a copolymerizable vinyl aryl monomer; (3) a polymerizable vinyl ether and (4) an acrylonitrile-zinc chloride complex. The polyester resin is chemically thickened by the polymerization of the vinyl ether which is catalyzed by the acrylonitrile-zinc chloride complex. The polyester resin is, therefore, thickened before the initiation of the vinyl copolymerization between the unsaturated polyester and the copolymerizable vinyl aryl monomer.

This invention is a continuation of application Ser. No. 671,849, now abandoned.

BACKGROUND OF THE INVENTION

Cured unsaturated polyester resins which have been reinforced by fibrous materials such as glass fiber mats or the like have excellent physical strength characteristics. However, the formation of shaped objects with such materials has presented problems because the fibers initially immersed within the uncured liquid resin tend to rise to the surface causing the object after curing of the resin to have irregularities in the surface.

To avoid this problem, preforms have been made by spraying glass fibers onto screens similar in shape to the final desired product. Air is sucked through the screen to hold the fibers in place. A binder is then sprayed over the fibers and cured to hold the fibers together in the desired form. The form is then placed into a mold and the unsaturated polyester resin is poured into the mold and cured therein. The resin must be viscous enough to adhere to the form, yet not so viscous to prevent proper wetting of the fibers.

To overcome this foregoing cumbersome and critical process, it has been proposed to coat the glass fibers with the uncured, unsaturated polyester resin liquid to thoroughly wet the fibers. The liquid resin is then thickened, without actually curing the resin, by chemical or physical means. The physical means include: (1) driving off volatile solvent in which a viscous polyester resin has been dissolved, or (2) using a heated viscous polyether resin then cooling the coated fiber after application. The chemical means: (1) the addition of a thickening agent such as MgO to the polyester resin, or (2) the partial copolymerization or curing of the resin to a gelled or B-stage. Fibrous reinforcements can thus be pre-coated with a low viscosity thickenable polyester resin which will therefore properly wet the fibers, yet the polyester resin coatings will rapidly lose its tacky state by the increase in viscosity enhancing the storability of the precoated fibers. Thus, the use of preforms is eliminated as well as the attendant mess of coating the irregular-shaped preform with a liquid resin. Glass fiber mats coated with such resins may be easily handled and charged to molding machines. More positive control of the amount of charge as well as the shape of the charge can thus be maintained resulting in higher quality molded products as well as economic savings.

However, such systems each have certain economic drawbacks. The solvent system, of course, results in loss of the solvent plus disposal of the fumes. Heating viscous polyesters to reduce their viscosity is costly and cumbersome. Chemical thickening the polyester resin such as by the addition of MgO or Mg(OH)$_2$ as shown in U.S. Pat. 2,568,331 issued to Vincent Frilette results in an eventual viscosity build-up; however, one of its drawbacks is that the initial thickening rapidly builds up the viscosity which reduces the pot life of the resin. Another difficulty encountered is the slow overall build-up of the viscosity of the resin. On the other hand, resins modified to rapidly cure to the B-stage have a tendency to continue to cure or harden beyond the B-stage within a short period of time. The B-stage actually represents an intermediate stage of the vinyl copolymerization or curing of the resin.

SUMMARY OF THE INVENTION

Quite surprisingly, I have discovered a chemically thickenable polyether resin which comprises the addition of a polymerizable vinyl ether monomer to a polyester resin, containing a copolymerizable vinyl aryl monomer such as styrene. The polymerization of the vinyl ether monomer is catalyzed by an acrylonitrile zinc chloride complex catalyst which does not catalyze the vinyl copolymerization of the polyester with the vinyl aryl monomer. The addition of the second monomer serves to further dilute polyester resin and thus, the initial viscosity of the polyester resin is actually lowered. However, within a short period of time, the viscosity rapidly rises as the vinyl ether monomer proceeds to polymerize.

In accordance with the invention, a curable unsaturated polyester resin which increases in viscosity after formation thereof, comprising: (a) an unsaturated polyester formed by condensing in approximately equimolar proportions: (1) at least one dicarboxylic acid, at least a portion of which contains alpha, beta-ethylenic unsaturation with (2) at least one dihydric alcohol; (b) a copolymerizable vinyl aryl monomer; (c) a polymerizable vinyl ether monomer selected from the class consisting of:

(1) CH$_2$=CH—O—R where R is an alkyl radical having 1–18 carbon atoms;

(2) 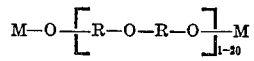

where M is CH$_2$=CH— or H, but at least one M must be CH$_2$=CH—, and R is

where $n$ is 2–4 and both R groups must have the same number of carbon atoms; and (3) 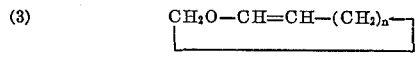

wherein $n$ is 1–4; and (d) an acrylonitrile zinc chloride complex.

The acrylonitrile zinc chloride complex acts as a catalyst for the polymerization of the vinyl ether. The polymerization of the vinyl ether results in an increase of the viscosity of the system before the subsequent curing of the resin caused by the copolymerization of the unsaturated polyester and the vinyl aryl monomer.

The figure depicts the process for making the product of the invention.

DETAILED DESCRIPTION

As previously described, in accordance with the invention, an unsaturated polyester resin is thickened by the addition of a polymerizable vinyl ether and an acrylonitrile zinc chloride complex. The acrylonitrile zinc chloride complex catalyzes the polymerization of the vinyl ether but does not initiate the vinyl copolymerization of the unsaturated polyester with the vinyl aryl monomer.

The term "unsaturated polyester" as used herein is defined as the condensation polymer produced by condensing approximately equimolar proportions of at least one dicarboxylic acid, at least a portion of which contains alpha, beta-ethylenic unsaturation, with at least one dihydric alcohol. The term "unsaturated polyester resin" as used herein is meant to define a combination of a condensation polymer or unsaturated polymer and a vinyl aryl monomer such as styrene, which may be copolymerized with the unsaturated polyester. Before copolymerization, the monomer-polyester mixture may be referred to as an uncured polyester resin and after the copolymerization, as a cured polyester resin.

Unsaturated polyester resins are well known in the art. (See, for example, U.S. Pat. 2,255,313 issued to Carleton Ellis.) The unsaturated polyester portion of the resin is a condensation polymer formed by polyesterifying dicarboxylic acids with dihydric alcohols. To provide unsaturation within the polyester, at least a portion of the dicarboxylic acid must contain alpha, beta-ethylenic unsaturation. Examples of such unsaturated dicarboxylic acids include maleic, fumaric acids as well as maleic anhydride. The remainder of the dicarboxylic acids are usually either saturated normal aliphatics such as adipic acid, succinic acid or the like, or aromatic diacids such as phthalic acid, isophthalic acid, or the like, as well as their halogenated derivatives such as tetrochlorophthalic anhydride.

Examples of common dihydric alcohols used in the polyesterification are ethylene glycol, 1,2-propane diol (propylene glycol), and the ether glycols, such as diethylene glycol, dipropylene glycol, or the like. The cyclic glycols such as 1,4-cyclohexane diol or the adducts or reaction products of alkylene oxides with bis-phenol A are also well-know constituents of polyesterification products which may be used in the unsaturated polyester resin of the invention.

The dicarboxylic acids and dihydric alcohols are reacted together in approximately equimolar proportions to form a polyester. The average molecular weight of the polymer is most conveniently measured with respect to the acid end groups. A gram of the polyester is titrated with KOH and the number of milligrams of KOH necessary to neutralize the gram of polyester is called the acid number of the polyester. Acid numbers below 100 usually signify polyesters having sufficient molecular weight to possess good physical properties. Therefore, the unsaturated polyesters useful in the invention are those possessing a molecular weight indicated by an acid number below about 100.

Unsaturated polyesters are conventionally dissolved in a copolymerizable vinyl aryl monomer such as styrene or vinyl toluene. The amount of monomer used generally is about 10–60% and preferably 20–50% by weight of the total polyester resin. Illustrative of such copolymerizable vinyl aryl monomers are styrene, alpha-methyl styrene, chlorostyrene, vinyl toluene, divinyl benzene, and the like. The unsaturated polyester resin is subsequently cured by copolymerization of the unsaturated polyester and the vinyl aryl monomer. Initiation of this copolymerization is usually effected by use of a free radical generating catalyst, such as, for example, a peroxide catalyst; although, UV light, or radiation, or the like are also less frequently used.

The additional vinyl ether monomer is polymerized by a separate catalyst, the acrylonitrile zinc chloride complex, which does not initiate the copolymerization of the unsaturated polyester with the vinyl aryl monomer. Thus, the use of a high temperature free radical generating catalyst such as benzoyl peroxide to initiate the copolymerization of the unsaturated polyester with the vinyl aryl monomer, or the omission of a catalyst altogether in favor of UV light or radiation copolymerization, initiation enables one to polymerize the vinyl ether at room temperature with an acylonitrile zinc chloride complex catalyst to thicken the entire resin and then at a subsequent time, to initiate the vinyl copolymerization of the polyester and vinyl aryl monomer by heating the resin to a temperature high enough to activate the high temperature free radical generating catalyst, or, if no free radical generating catalyst is used, to subject the resin to ultraviolet light or radiation to initiate the vinyl copolymerization of the resin.

The condensation polymer of unsaturated polyester to monomer weight ratios in unsaturated polyester resin may vary from 90% polymer–10% monomer to as high as 40% polymer–60% monomer. Because the vinyl ether is independently polymerized with itself and is therefore, unavailable to any effective extent as a coreactive ingredient in the subsequent vinyl copolymerization, the system must always contain a vinyl aryl monomer such as styrene to copolymerize with the unsaturated polyester. However, since the physical properties of a polyester resin are normally dependent upon the ester or condensation polymer present, the physical properties can be detrimentally influenced by the presence of excessive amounts of monomers. Therefore, about 50% monomer is normally considered to be the maximum amount; although, in certain instances, depending upon the particular polyester, monomer amounts as high as 60% can be used. Because of these limitations, the presence of the additional monomer (vinyl ether) requires a reduction of the amount of vinyl aryl monomer used in the system. It has been found that excellent results are achieved, for example, if the total sum of the monomeric content is from 10–60%, preferably 30–50%, of the total weight of the polyester resin. In accordance with the invention, about 10–25% by weight vinyl ether is the preferred range for this monomer with the balance of the monomeric content to be vinyl aryl monomer. Regardless of the amount of vinyl ether used within this range, however, at least 10–20% by weight vinyl aryl monomer must also be used to insure adequate vinyl copolymerization in the subsequent curing step. Therefore, the maximum amount of vinyl aryl monomer is 50% when the minimum (10%) amount of vinyl ether monomer is used.

As mentioned previously, unsaturated polyester resins are conventionally cured by the vinyl copolymerization of the unsaturated polyester and the vinyl aryl monomer across the ethylenic double bond contained in each. The initiation of this copolymerization is usually effected by the use of free radical generating catalyst such as, for example, a peroxide catalyst; although UV light or radiation or the like are also less frequently used. As with conventional unsaturated polyester resins, the unsaturated polyester resin of this invention is also subsequently cured by vinyl copolymerization of the unsaturated polyester and unsaturated monomer. However, because of the chemical thickening mechanism used in the resin of the invention and its utility in thickening the polyester resin without the initiaton of the vinyl copolymerization, the preferred practice in initiating the subsequent vinyl copolymerization is to either utilize a high temperature catalyst or to omit the catalyst entirely and rely on external free radical initiating means such as UV light, radiation or the like. In this way, the usaturated polyester resin is chemically thickened via the polymerization of the polymerizable vinyl ether, yet the resin has very long shelf life because the vinyl copolymerization or curing is not commenced until the input of the additional light or heat energy or the like to initiate the free radical vinyl polymerization.

Examples of high temperature peroxide catalysts which can be used to initiate the copolymerization include benzoyl peroxide, cumene hydroperoxide, di-t-butyl peroxide, t-butyl perbenzoate, dicumyl peroxide, 2,5-dimethylhexane-2,5-dihydroperoxide, t-butyl hydroperoxide, p-methanehydroperoxide, and the like. Other high temperature free radical generating catalysts which can also be used include, for example, 2,2'-azobisisobutyronitrile. The term "high temperature catalyst" as used herein is intended to define an agent catalytically inactive below about 70° C.

The vinyl ether polymerization is catalyzed by an acrylonitrile zinc chloride complex. The complex comprises acrylonitrile and zinc chloride in a molar ratio of approximately 1 to 1. A method of preparing the complex is described by MiImoto, T. Otsu and M. Nakabayashi in Makromolekulare Chem. 65 (1963) at page 200. Briefly, the complex is made by dissolving anhydrous $-ZnCl_2$ in excess acrylonitrile in an inert atmosphere and refluxing the reaction mass at 50-60° C., followed by distillation of the excess acrylonitrile. The choice of this particular catalyst is dictated by the need for a catalyst which will initiate the polymerization of the vinyl ether without initiating the vinyl copolymerization between the unsaturated polyester and the vinyl aryl monomer. Furthermore, although this catalyst can be classified as a cationic catalyst, and it is known that vinyl aryl monomers such as styrene, are susceptible to homopolymerization by cationic catalysts, the acrylonitrile zinc chloride complex is not effective as a homopolymerization catalyst for the vinyl aryl monomer. The amount of acrylonitrile zinc chloride complex to be added to the resin ranges from 0.5% to 10% by weight, based on the total weight of the resin. Amounts below 0.5% are not sufficiently effective to polymerize the vinyl ether as rapidly as is desirable. The preferred range is actually about 1–5%; however, slightly higher amounts may be used to further accelerate the polymerization of the vinyl ether.

It should be noted that the initial chemical thickening which occurs in the invention is not a gelation or B-stage of the resin. Such gelation or B-stage is by definition indicative of the vinyl copolymerization between the unsaturated portion of the condensation polymer or unsaturated polyester and the vinyl aryl monomer. The unsaturated polyester and vinyl aryl monomer portions of the chemically thickened resin of the invention remain, for example, completely soluble in acetone until the subsequent cure of the polyester is initiated by the peroxide catalyst or other free radical generating means. Gelled or B-stage polyester resins, in contrast, are not entirely soluble in acetone, which insolubility is indicative of the presence of vinyl copolymerization.

The vinyl ethers which may be used in the invention include the following:

(a) alkyl vinyl ethers having the formula:

$$CH_2=CH-O-R$$

where R is an alkyl radical having 1–18 carbon atoms. Examples of this class include: ethyl vinyl ether, isobutyl vinyl ether, tertiary butyl vinyl ether, cetyl vinyl ether, or the like.

(b) mono and di-vinyl ethers of the ether glycols having the formula:

$$M-O-[R-O-R-O]_{1-20}-M$$

where M is H or $CH_2=CH-$, but at least one M must be $CH_2=CH-$ and R is

where n is 2–4.

Examples of this class include the monovinyl and divinyl ethers of diethylene glycol, polyethylene glycol, dipropylene glycol, polypropylene glycol; polyethers made from tetrahydrofuran, and the like.

(c) cyclic vinyl ethers having the formula:

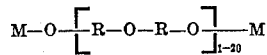

where n is 1–4.

Such cyclic vinyl ethers include, for example, dihydropyran or the like.

The invention will be more completely understood by referring to the attached flow sheet and the following examples.

EXAMPLE I 91 grams of a general purpose polyester resin Koplac 2000 (comprising 55 grams of a phthalic-maleic-propylene glycol polyester condensed in mole ratios of 1:1:2, dissolved in 36 grams of styrene, and having an acid number of about 25) was mixed with 1% by weight tertiary butyl peroctoate, 1% by weight tert-butyl perbenzoate, 9 grams of isobutyl vinyl ether and 2.7 grams acrylonitrile zinc chloride complex. After thorough mixing of the ingredients, a viscosity measurement was taken on a Brookfield viscometer and the viscosity measured 360 centipoises. A portion of the mixture was heated to 60° C. at which temperature it solidified in 1 hour. A second portion was kept at room temperature and it solidified in 2 days. Both portions were then cured by heating at 100° C. for 1 hour. The cured products were tested to determine physical and chemical properties. The results are tabulated below:

TABLE I

| | |
|---|---|
| Barcol hardness | 36. |
| Flexural strength | $0.273 \times 10^6$. |
| Flexural modulus | 9,260 p.s.i. |
| Tensile: | |
|   Strength | 5,490 p.s.i. |
|   Modulus | $0.300 \times 10^6$. |
|   Percent elongation | 2.9. |
| Compressive: | |
|   Strength | 11,380 p.s.i. |
|   Modulus | $0.233 \times 10^6$. |
|   Heat deflection temperature | 118° F. |

EXAMPLE II

Following the procedure of Example 1, two additional mixtures, each containing 100 grams of Koplac 2000 and 1% by weight tertiary-butyl peroctoate were prepared. To the first sample (Sample A) was added 10 grams isobutyl vinyl ether and 2 grams of acrylonitrile zinc chloride while to the second sample (Sample B) was added 10 grams of isobutyl vinyl ether and 5 grams of acrylonitrile zinc chloride. Each sample was allowed to stand at room temperature. Sample A solidified in three days, while Sample B solidified in 3 hours. Both samples cured at 100° C. for 1 hour yielded products comparable to that obtained in Example I.

Similar test results were obtained when ethyl vinyl ether, t-butyl vinyl ether, cetyl vinyl ether, dihydropyran, diethylene glycol mono vinyl ether, and diethylene glycol divinyl ether were substituted for the isobutyl vinyl ether.

Thus, the invention provides a chemically thickenable polyester resin system which will thicken and even solidify before initiation of the vinyl copolymerization between the unsaturated polyester and the vinyl aryl monomer. The system can, therefore, be used to impregnate the glass fiber mats or the like which can be subsequently shaped and cured in a mold press or the like.

I claim:

1. An uncured chemically thickened unsaturated polyester resin of substantially increased viscosity consisting essentially of:
   (a) an unsaturated polyester formed by condensing approximately equimolar proportions of
      (1) at least one dicarboxylic acid at least a portion of which contains alpha, beta-ethylenic unsaturation with
      (2) at least one dihydric alcohol;
   (b) a copolymerizable vinyl aryl monomer selected from the group consisting of styrene, alpha-methyl styrene, chlorostyrene, vinyl-toluene and divinyl benzene;

(c) a vinyl ether selected from the class consisting of:
(1) $CH_2=CH-O-R$ where R is an alkyl radical having 1–18 carbon atoms;

(2) 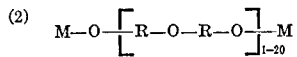

where M is $CH_2=CH-$ or H, but at least one M must be $CH_2=CH-$ and R is

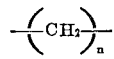

where $n$ is 2–4 and both R groups must have the same number of carbon atoms; and (3) 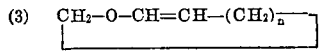

wherein $n$ is 1–4;
where the vinyl ether is polymerized to a degree sufficient to increase substantially the viscosity of the polyester resin; and (d) an acrylonitrile-zinc chloride complex catalyst, the acrylonitrile-zinc chloride complex catalyzed the polymerization of the vinyl ether to increase the viscosity of the unsaturated polyester resin before initiation of curing of the resin by copolymerization of the unsaturated polyester and the vinyl phenyl monomer;
wherein at least 10% by weight of the total weight of the unsaturated polyester resin is the vinyl phenyl monomer and from 10 to 25% by weight of the total weight of the unsaturated polyester resin is the vinyl ether and the sum of the weight percent of the vinyl pheyl monomer and the vinyl ether does not exceed 60% of the total weight of the polyester resin, and between 0.5 and 10% by weight of the total weight of the unsaturated polyester resin is the acrylonitrile-zinc chloride complex catalyst.

References Cited
UNITED STATES PATENTS 3,519,698   7/1970   Baum.
3,574,788   4/1971   Baum.

MELVIN GOLDSTEIN, Primary Examiner

U.S. Cl. X.R.

117—126 GR; 161—195, DIG. 4; 260—863, 867, 869